United States Patent
Fragapane et al.

(10) Patent No.: US 6,810,399 B2
(45) Date of Patent: Oct. 26, 2004

(54) PROPERTY EXTENSIONS

(75) Inventors: Paolo Fragapane, Bristol (GB); Stephen David Cave, Gloucester (GB); Robert Lloyd Lavender, Nr Wedmore (GB); James Adam Steadman, Bradlow Ledbury (GB); Andrew Osborn, Bristol (GB)

(73) Assignee: Oracle International Corporation, Redwood Shores, CA (US)

( * ) Notice: Subject to any disclaimer, the term of this patent is extended or adjusted under 35 U.S.C. 154(b) by 158 days.

(21) Appl. No.: 09/730,724

(22) Filed: Dec. 7, 2000

(65) Prior Publication Data

US 2002/0046211 A1 Apr. 18, 2002

(30) Foreign Application Priority Data

Aug. 30, 2000 (GB) .............................. 0021309

(51) Int. Cl.[7] .............................................. G06F 17/30
(52) U.S. Cl. ........................ 707/10; 707/3; 707/104.1; 709/201
(58) Field of Search ...................... 707/10, 514, 101, 707/202, 200, 204, 500, 1, 2, 3, 104.1, 513, 5; 709/201

(56) References Cited

U.S. PATENT DOCUMENTS

| | | | | |
|---|---|---|---|---|
| 4,751,674 A | * | 6/1988 | Aoyagi et al. ............... | 707/514 |
| 5,410,688 A | * | 4/1995 | Williams et al. ............... | 707/10 |
| 5,551,020 A | * | 8/1996 | Flax et al. .................... | 707/101 |
| 5,590,318 A | * | 12/1996 | Zbikowski et al. .......... | 707/202 |
| 5,613,134 A | | 3/1997 | Lucus et al. ................. | 395/788 |
| 5,724,575 A | * | 3/1998 | Hoover et al. ................ | 707/10 |
| 5,860,132 A | * | 1/1999 | Carter et al. ................. | 707/200 |
| 5,995,983 A | * | 11/1999 | Mano ........................ | 707/204 |
| 6,249,794 B1 | * | 6/2001 | Raman ........................ | 707/500 |
| 6,292,626 B1 | * | 9/2001 | Ino et al. ..................... | 707/200 |
| 6,345,270 B1 | * | 2/2002 | Tanaka ........................ | 707/200 |
| 6,418,441 B1 | * | 7/2002 | Call ............................ | 707/10 |
| 6,421,767 B1 | * | 7/2002 | Milillo et al. ................ | 707/204 |
| 6,507,856 B1 | * | 1/2003 | Chen et al. ................... | 707/10 |
| 6,665,659 B1 | * | 12/2003 | Logan ........................... | 707/3 |

FOREIGN PATENT DOCUMENTS

| | | |
|---|---|---|
| GB | 2 328 537 A | 8/1997 |
| GB | 2 330 221 A | 9/1997 |

* cited by examiner

*Primary Examiner*—Charles Rones
*Assistant Examiner*—Hassan Mahmoudi
(74) *Attorney, Agent, or Firm*—Swidler Berlin Shereff Friedman, LLP

(57) ABSTRACT

The present invention relates to a repository which stores properties of database objects. The repository includes a first store for storing a number of predetermined properties, and a second store for storing additional properties. A processor is provided for determining or modifying the properties stored in the first and second stores.

9 Claims, 3 Drawing Sheets

|   | 6↓ | 7↓ | 8↓ | 9↓ |
|---|---|---|---|---|
| 2→ | X1 | N | S | B |
| 3→ | X2 | N | S | B |
| 4→ | X3 | N | S | B |
| 5→ | X4 | N | S | B |

Fig. 1.

PROPERTY EXTENSIONS

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION BY REFERENCE OF MATERIAL SUBMITTED ON A COMPACT DISC

Not Applicable

BACKGROUND OF THE INVENTION (1) Field of the Invention

The present invention relates to a repository which stores properties of database objects and in particular to a metadata repository for a relational database.

(2) Description of Related Art

Relational databases generally comprise of two main portions, namely an informational database which stores data in the form of objects, and a metadata repository which stores information concerning the properties of the objects.

Thus, for example, in Oracle's Discoverer database, the metadata defining the properties of objects stored within the database are contained within the EUL (End User Layer) of the database.

This system allows the data stored in the informational database to be updated, whilst the properties of the data can be maintained separately in the repository.

Typically, the properties of the database objects are stored in the metadata repository in the form of object tables. In general, each object table defines the properties of a respective type of object contained within the database, with each row in the table defining the properties for a specific object.

Thus for example, "Folder" objects contained within the database would have a corresponding "Folder" table within the metadata repository. The folder table defines the properties of all of the "Folder" objects, with the properties of each object being set out on a respective row of the table. A typical example of such an object table is shown in FIG. 1 and will be described in more detail below.

The structure of both the informational database and the metadata repository, are determined by the database designers. The tables used in the metadata repository have a fixed structure which allows a limited number of properties to be defined, as envisaged by the database designers.

Typically, relational databases are provided centrally for a number of different clients. In this case, the properties of the objects are initially set by the database operators.

However, it is common for different clients using the database to want to add in additional properties for certain database objects. Currently, this can only be achieved by having each respective user define their own property information in an alternative data store, separate from the repository.

In this case, the additional property information, which for example could be stored on the user's own personal computer, must then be referenced back to the respective object in the repository.

However, there are a number of disadvantages to this technique. Firstly, there is no longer a single source of truth for the properties of the database objects. This means, that should the properties of the object need to be referred to, then it is necessary to check both the repository and the separate data store to ensure all the property data is retrieved.

Secondly, there is no integrity between the separate data sources. Accordingly, if the element is removed from the original repository there is no effect on the additional information provided in the secondary data store.

Thirdly, transferring or duplicating the repository requires having separate processes for moving the additional property information. Thus, if the additional property information is to be provided to an alternative user, it must be copied from the original user's processing system and onto the additional user's processing system.

As an alternative, repositories can utilise a fixed set of attributes for client extensions. This allows clients to define a limited number of properties for each object. However, because of the use of the fixed table structures within the repository, this has the disadvantage that there is a limit to the number of extended attributes and there is a limit to the size of any individual extended attributes, thereby limiting the properties that can be defined.

BRIEF SUMMARY OF THE INVENTION

In accordance with the present invention, we provide a repository which stores properties of database objects, the repository including:

a. a first store for storing a number of predetermined properties;

b. a second store for storing additional properties; and, c. a processor coupled to the first and second stores for determining or modifying the properties stored in the first and second stores for at least one of the database objects.

Accordingly, the present invention provides a repository which stores properties of database objects. The repository includes a first store for storing predetermined properties and a second store for storing additional properties. With both the first and second stores being provided within the repository, a processor can be used for accessing or modifying the properties within both stores simultaneously. This ensures that a single source of truth is provided for all the properties of the database objects, with integrity being maintained between the properties stored in the first and second store. Furthermore, by providing both first and second stores centrally within the repository, this overcomes the need for additional information to be located at a user's remote location, thereby ensuring that the property information is available to all users of the database.

Typically the first store comprises a fixed table structure, the predetermined properties of each object being stored in the respective portion of the fixed table structure. The properties of each object are generally stored in a respective row of the fixed table structure, with each property being stored in a respective column. In this case, each table generally relates to a different type of object with the properties of each object of the given type being stored in a respective row. However, alternative table structures may be provided. Thus, for example each table could include details of multiple types of object, or details of separate objects individually. Alternatively, the elements could be arranged in columns with the properties arranged in the rows of the table.

Typically, the second store comprises a segmented table structure, the additional properties of each object being stored in one or more respective portions of the segmented table structure. By using a segmented table structure, this allows a number of rows to be assigned to a given object (or element). This ensures that any number of properties can be stored for a given object thereby vastly increasing the versatility of the repository system.

Typically the additional properties of each object are provided as an XML file. This provides a simple way of allowing a user, or an operator of the database system, to define additional properties for objects within the database. The nature of XML files means that there is no limit to the number of additional properties that can be defined. Alternative techniques could however be used, such as the use of a simple text file or another SGML file format. However, the use of an XML file is particularly advantageous as it allows the elements, and attributes of the XML schema to be used to define the properties of the data.

Typically the XML file is divided into one or more segments which each segment being stored in a respective row of the segmented table structure. This allows the segmented table to store a limited number of characters in each row whilst still accommodating the entirety of the XML file, thereby ensuring that all the properties of the respective object are stored. However, the table may be modified to include an additional number of columns, for example with different portions of the XML file being stored in different columns.

The processor is usually adapted to extract the additional properties from the second data store by extracting and recombining the segments of the XML file. Once the XML file has been recombined, this allows the processor to determine the properties of the object contained within the database. However, any suitable system, such as extracting portions of text from the table may also be used.

Typically the properties are stored as name-value pairs. In this case, the name of the name-value pair represents the particular property under consideration, whilst the value represents the particular value of the property. However, the properties may be stored in any appropriate format depending on the type of property being defined.

Typically the repository is adapted to be coupled to at least one end station. In this case, the processor is usually adapted to provide the properties of at least one database object in response to a request from the end station. This allows remote users who are accessing the database from a remote location to obtain details of the properties of the objects from the repository, with the processor ensuring that the user obtains properties from both the first and second store in response to a single request.

It will be realised from this that the processing operations required to generate a query and then obtain a result can be split between the processor at the end station and the processor at the repository. In particular, the processor at the end station can generate the query, causing the repository processor to retrieve the results. Alternatively, the query could also be generated by the repository processor in response to input commands.

The repository is usually adapted to couple to at least one end station via a communications network. This allows remote users to access the database, for example, by the Internet.

The present invention also provides a relational database system for providing information regarding the database objects. The system typically includes a database for storing the database objects, the database being coupled to a repository according to the present invention.

In this case, the relational database system usually further comprises a number of end stations coupled to the database and the repository via a communications network. In this case, the database and the repository are responsive to request from the end stations to provide information regarding the database objects. Alternatively however the database can be a stand alone database.

BRIEF DESCRIPTION OF THE DRAWINGS

Examples of the present invention will now be described with reference to the accompanying drawings, in which:

FIG. 1 is a schematic diagram of a repository table using a fixed table structure;

DETAILED DESCRIPTION OF THE INVENTION

Figure 1:
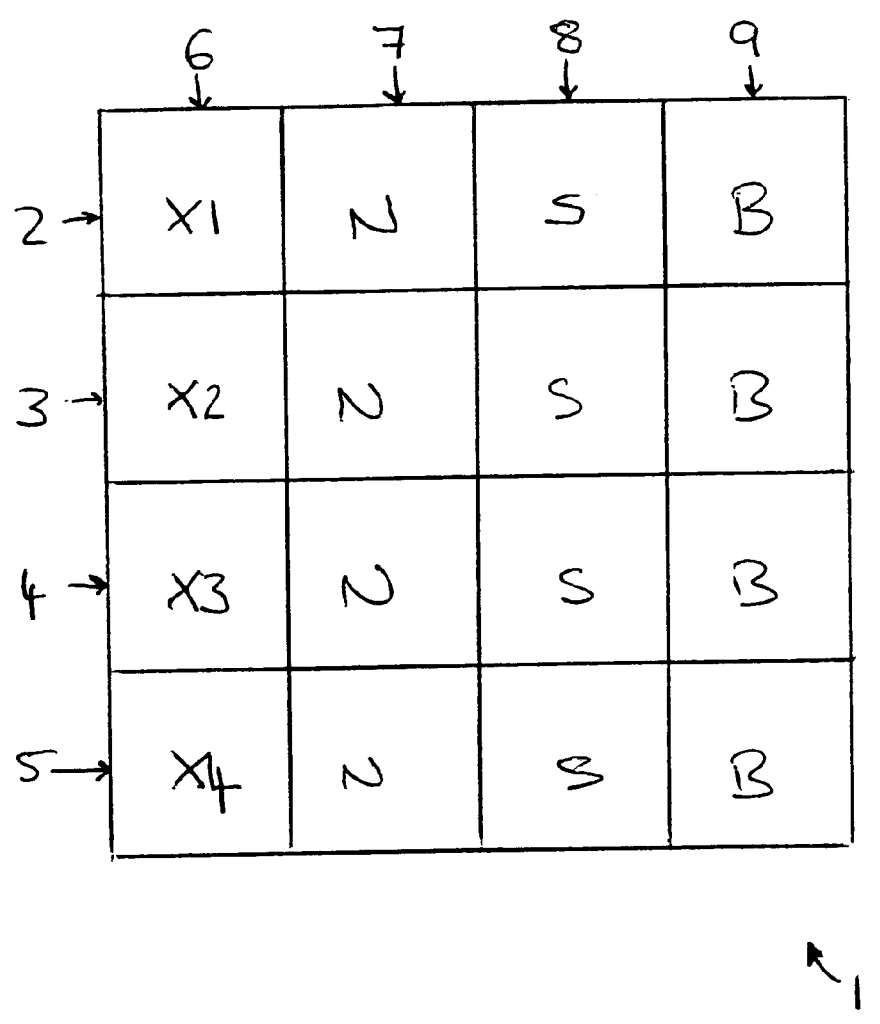

FIG. 1 is a schematic diagram of a repository table 1 which uses a fixed table structure (hereinafter referred to as a fixed table 1) to store database object properties in accordance with the prior art.

In this example, the fixed table 1 includes a number of rows 2,3,4,5 and a number of columns 6,7,8,9. The table provides information concerning the properties of a specific type of object. In this example, each object (also known as an element) is assigned a respective row 2,3,4,5 in the table, with each property of the respective object being set out in the columns 6,7,8,9. At least one of the properties is an object ID which is used by the processor for uniquely identifying the respective object. In this example, the object ID X1, X2, X3, X4 of four example objects is located in column 6 of the respective row 2, 3, 4, 5 as shown. The remaining properties are then defined in columns 7, 8, 9.

Thus for example, the type of object may be departments within an organization. In this case, each of the properties of the departments, such as names N, staffing details S, and budgets B are defined in a respective one of the columns 7, 8 and 9 as shown, with each department within the organisations being set out on a respective row 2, 3, 4, 5.

Thus, in this example, with the structure of the table being fixed, this allows only a fixed number of properties to be defined for a given number of database objects.

Details of these properties can be obtained on request by accessing the relevant rows 2, 3, 4, 5 of the table using the respective object IDs X1, X2, X3, X4.

Figure 2:
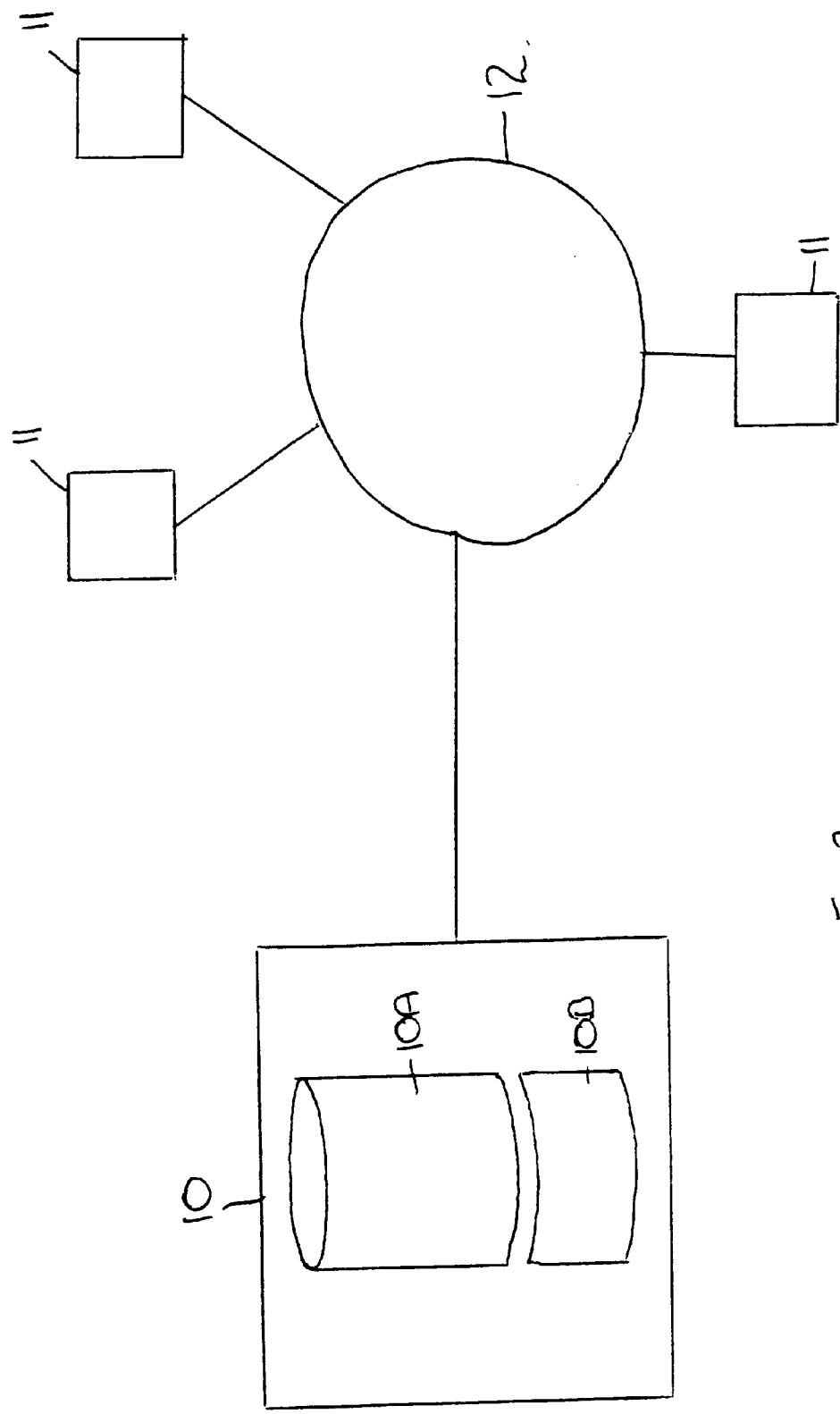
FIG. 2 is a schematic diagram of a database system according to the present invention; and, FIG. 3 is a schematic diagram of a repository table using a segmented table structure according to the present invention.

A relational database system which can be adapted to operate according to the present invention is shown in FIG. 2. As shown, the database system typically includes a database centre 10 coupled to a number of end stations 11 via a communications network, such as the Internet 12. The database centre 10 will generally include at least an informational database and a relational database as represented at 10A and 10B respectively. However, in some circumstances, all the data can be stored in a single database 10.

In use, a user of one of the end stations 11 is able to transfer requests for information from the respective end station 11 via the Internet 12 to the database centre 10. The database centre 10 will then operate to retrieve the information from the database 10A and return the information via the communications network 12 to the user at the end station 11.

Typically, as will be appreciated by a person skilled in the art, it will be necessary for the user of the end station 11 to register with the database center, usually by entering password codes or the like.

In order to process the query submitted by the end station 11, the database centre 10 includes a processor (not shown). In use the processor receives the user's request and generates an appropriate query, typically in SQL (Structured Query Language) format, which causes the database 10A to return the desired information, as will be appreciated by a person skilled in the art.

Figure 3:
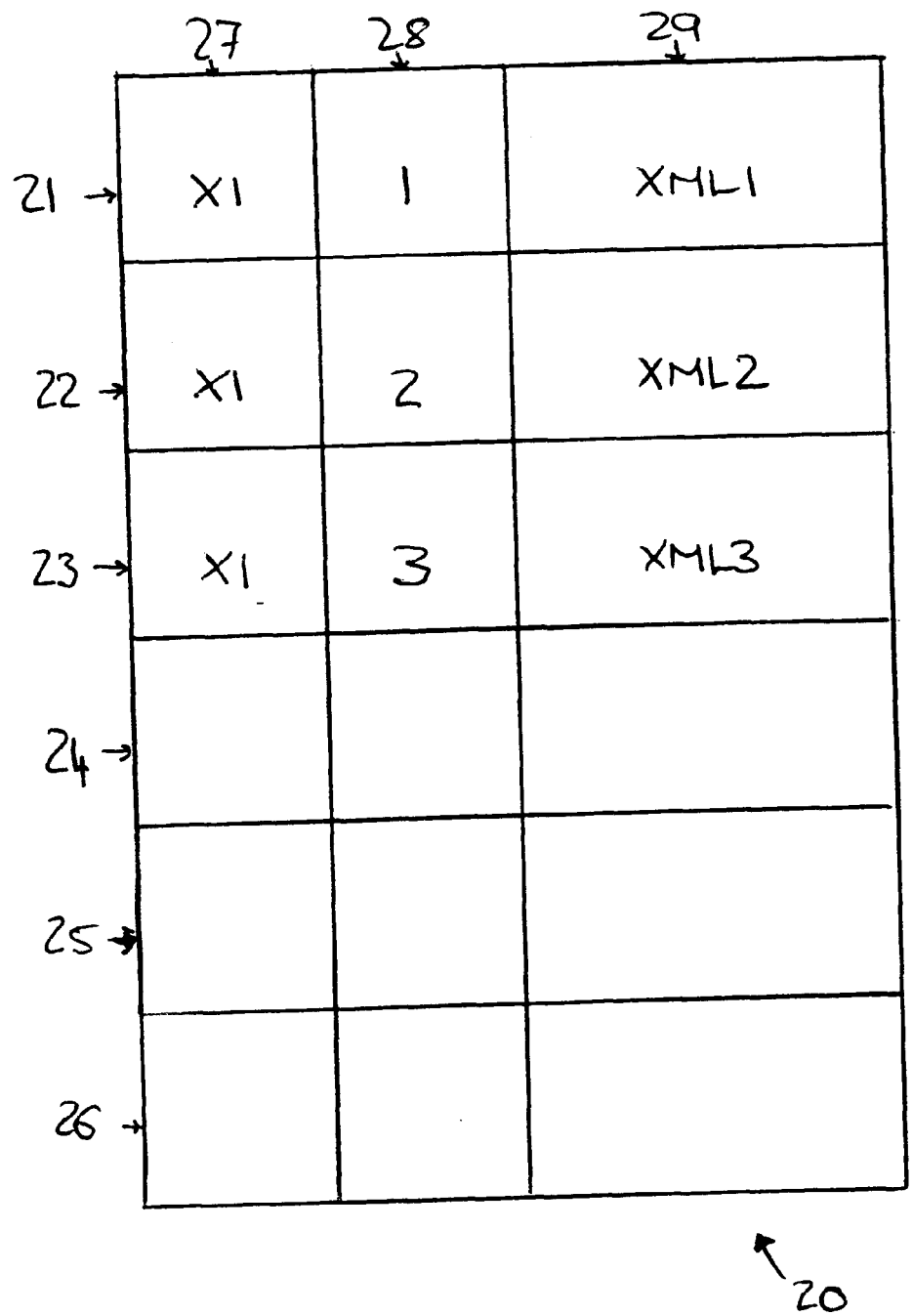

In the system according to the present invention, the repository 10B is adapted to include both a fixed table 1, as shown for example in FIG. 1 and a segmented table 20, an example of which is shown in FIG. 3, and which will now be described.

The segmented table 20 shown in FIG. 3, includes a number of rows 21,22,23,24,25,26 and a number of columns 27,28,29.

As in the fixed table structure, one of the columns 27 contains the object ID of the object whose properties are being defined. Column 28 includes a sequence ID, the relevance of which will be explained in more detail below. Column 29 is designated as a general properties column into which properties can be entered and must be capable of storing a character string of variable length (typically a maximum of 250 characters).

As far as the rows 21,22,23,24,25 of the segmented table are concerned, instead of using only a single row to define the properties for each object, the segmented table structure uses a number of rows 21,22,23 to define the properties of a given object.

In this example, the properties which are to be included in the segmented table are initially defined as an XML file (hereinafter referred to as an XML property file), an example of which is shown below.

XML Property File

```
<?xml version="1.0" encoding="ISO-8859-1"?>
<EULElement Id="106084" Type="DCEASMPolicy">
    <InternalProperties>
        <Property>
            <Key>ASMAnalyzePercentage</Key>
            <Value>100</Value>
        </Property>
        <Property>
            <Key>ASMAnalyzeRefreshDays<Key>
            <Value>30</Value>
        </Property>
        <Property>
            <Key>ASMApplyExclusions</Key>
            <Value>true</Value>
        </Property>
        <Property>
            <Key>ASMApplyFolders</Key>
            <Value>true</Value>
        </Property>
        <Property>
            <Key>ASMApplyUsersRoles</Key>
            <Value>true</Value>
        </Property>
        <Property>
            <Key>ASMQueryMinElapsedTime</Key>
            <Value>0</Value>
        </Property>
        <Property>
            <Key>ASMQueryMinExecution</Key>
            <Value>0</Value>
        </Property>
    </InternalProperties>
    <ExternalProperties>
    </ExternalProperties>
</EULElement>
```

The versatility of XML files means that any properties can be defined. Furthermore the properties can be sub-divided, for example into different types of properties, allowing different properties to be handled differently. This depends on how the metamodel of the database is constructed.

Thus, for example, the metamodel of database could allow each metadata object to have a set of internal properties, which are not exposed to clients of the database and a set of external properties which are exposed to clients of the database. The XML property file shown above shows two children nodes of the main element node, one of each for internal/external properties.

Any number of property definitions can be included within either the internal properties, which are typically set by the database operator, or within the external properties which are typically set by a user of the database. The above fragment shows a number of internal property definitions. The property definitions are in the form of name-value pairs, with the name representing the property and the value representing the value of the property. Thus, for example, the property ASM analyze percentage has a value of 100. The generic format of XML files allows any number of properties to be defined.

In use, the XML property file is written into the column 29 to define the properties of a respective object. As set out above, the column 29 of the segmented table 20 can only contain a limited number of characters in each row. Accordingly, if the XML property file has more characters than can be stored in any one row, then the XML property file must be divided into a number of separate portions before it can be stored. In this case, the portions are each stored in a separate row of the table so that the properties of each object are defined in one or more rows of the segmented table 20. Thus, for example, if the XML property file described above were to be stored in the segmented table 20, it may be that the file needs to be divided into three portions XML1, XML2, XML3 before the portions are small enough to be stored in the column 29. In this example, three rows 21,22,23 would therefore be assigned to the relevant object, with a separate portion XML1, XML2, XML3 of the XML property file being stored in each column 29 of each row 21,22,23.

Accordingly, once an XML property file has been submitted to the database 10, the processor operates to split the XML property file into a number of segments which do not exceed the character length of the column 29. The portions XML1, XML2, XML3 of the XML property file are then written into column 29 of the appropriate rows 21,22,23. At the same time, a sequence ID S1, S2, S3 is assigned to each portion XML1, XML2, XML3 of the XML property file respectively to indicate the order in which the portions of the file need to be recombined to reform the original file. This sequence ID S1, S2, S3 is written into column 28. Accordingly, the object ID is written into column 27 with the sequence ID of the particular XML property file portion being entered into column 28.

To highlight this, the object of this example is given the object ID X1, as shown in FIG. 3. Accordingly, the object ID X1 is entered in rows 21,22 and 23 of the segmented table in the column 27. The sequence IDs S1, S2, S3 are then entered in the column 28 referring to the portions XML1, XML2, XML3 of the XML file which is entered in column 29.

When the database requires access to any of the properties of the particular object, the object ID is used by the processor to access the properties. In this case, the processor accesses both the fixed table 1 and the segmented table 20 to determine the properties of the object. Thus for example in the case of object X1, the processor would access the row 2 of fixed table 1 and rows 21, 22, 23 of the segmented table 20.

Properties are extracted from the fixed table in the normal manner. However, in contrast to this, properties from the segmented table are obtained by indexing the relevant rows 21, 22, 23 and then reforming the XML file by recombining the segments in accordance with the sequence ID set out in column 28.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

What is claimed is:

1. A repository which stores objects, the repository including:
   a. a first store for properties of a database storing a number of predetermined properties;
   b. a second store for storing additional properties, the first store and the second store being provided within the repository, wherein the second store comprises a segmented table structure, the additional properties of each object being stored in one or more respective portions of the segmented table structure, wherein the additional properties of each object are provided as an XML file, wherein the XML file is divided into one or more segments, each segment being stored in a respective row of the segmented table structure, wherein the entire XML file is stored in the segmented table structure, and wherein each segment has an associated sequence identifier indicating a sequence of the segments in the XML file and,
   c. a processor coupled to the first and second stores for determining or modifying the properties stored in the first and second stores for at least one of the database objects.

2. A repository according to claim 1, wherein the processor is adapted to extract the additional properties from the second data store by extracting and recombining the segments of the XML file in accordance with the sequence identifiers associated with the segments.

3. A repository according to claim 2, wherein the first store comprises a fixed table structure, the predetermined properties of each object being stored in a respective portion of the fixed table structure.

4. A repository according to claim 3, wherein the properties of each object are stored in a respective row of the fixed table structure, each property being stored in a respective column.

5. A repository according to claim 1, wherein the properties are stored as name-value pairs.

6. A repository according to claim 1, the repository being adapted to couple to at least one end station, the processor being adapted to provide the properties of at least one database object in response to a request from the end station.

7. A repository according to claim 6, wherein the repository is adapted to couple to at least one end station via a communications network.

8. A relational database system for providing information regarding database objects comprising a database for storing the database objects, the database being coupled to a repository according to claim 1.

9. A relational database system according to claim 8, the system further comprising a number of end stations coupled to the database and the repository via a communications network, the database and repository being responsive to requests from the end stations to provide information regarding the database objects.

* * * * *

UNITED STATES PATENT AND TRADEMARK OFFICE
CERTIFICATE OF CORRECTION

PATENT NO. : 6,810,399 B2
DATED : October 26, 2004
INVENTOR(S) : Paolo Fragapane et al.

It is certified that error appears in the above-identified patent and that said Letters Patent is hereby corrected as shown below:

<u>Title page,</u>
Item [75], Inventor, change "Bradlow Ledbury" to -- Bath --

Signed and Sealed this

Twenty-first Day of June, 2005

JON W. DUDAS
*Director of the United States Patent and Trademark Office*